US007869466B2

(12) United States Patent
Gries et al.

(10) Patent No.: US 7,869,466 B2
(45) Date of Patent: Jan. 11, 2011

(54) DATA TRANSMISSION METHOD AND DEVICE FOR CARRYING OUT THE METHOD

(75) Inventors: Ulrich Gries, Hannover (DE); Ulrich Schreiber, Hohenhameln/Equord (DE); Peter Steinborn, Lehrte (DE)

(73) Assignee: Thomson Licensing, Boulogne-Billancourt (FR)

( * ) Notice: Subject to any disclaimer, the term of this patent is extended or adjusted under 35 U.S.C. 154(b) by 52 days.

(21) Appl. No.: 12/308,922

(22) PCT Filed: Jun. 19, 2007

(86) PCT No.: PCT/EP2007/056098

§ 371 (c)(1), (2), (4) Date: Dec. 29, 2008

(87) PCT Pub. No.: WO2008/003588

PCT Pub. Date: Jan. 10, 2008

(65) Prior Publication Data

US 2009/0323725 A1 Dec. 31, 2009

(30) Foreign Application Priority Data

Jul. 3, 2006 (DE) .................. 10 2006 030 977

(51) Int. Cl.
*H04J 3/00* (2006.01)
(52) U.S. Cl. ...................................... 370/498
(58) Field of Classification Search ............ 370/498, 370/496, 497
See application file for complete search history.

(56) References Cited

U.S. PATENT DOCUMENTS 4,606,042 A * 8/1986 Kahn et al. .................. 380/37

| | | | |
|---|---|---|---|
| 6,094,452 A | 7/2000 | Gelblum et al. | |
| 6,275,552 B1 | 8/2001 | Ando | |
| 6,400,785 B1 * | 6/2002 | Sunaga et al. | 375/372 |
| 6,535,688 B1 * | 3/2003 | Kawamura et al. | 386/95 |

FOREIGN PATENT DOCUMENTS

| GB | 2320650 | 6/1998 |
|---|---|---|
| JP | 4-124931 | 4/1992 |

OTHER PUBLICATIONS

Search Report Dated Sep. 6, 2007.

* cited by examiner

*Primary Examiner*—Derrick W Ferris
*Assistant Examiner*—Mohammad Anwar
(74) *Attorney, Agent, or Firm*—Robert D. Shedd; Jeffrey M. Navon

(57) ABSTRACT

The invention relates to the technical field of data transmission via a transmission link according to the TDM method, corresponding to time division multiplex. Such a method is used in an audio mixing console in order to transport the sample words of a plurality of audio channels jointly to an audio DSP processor and, after processing, to transmit them back from said processor to an output processor. Since the data output process is performed in an automated manner with the aid of a DMA unit, severe interfering noise can occur in cases of error, said noise also being output via the loudspeakers. The invention is based on the aim of avoiding such interfering effects. An error detection method based on the marking of data frames is used for this. For this purpose, a number of marking bits of the time slot of the data frame are set, the bit pattern of the marking bits being alternated in a defined sequence. Upon error detection, the outputting of the data via the loudspeakers is prevented, such that no interfering noise arises.

12 Claims, 3 Drawing Sheets

DATA TRANSMISSION METHOD AND DEVICE FOR CARRYING OUT THE METHOD

This application claims the benefit, under 35 U.S.C. §365 of International Application PCT/EP2007/056098, filed Jun. 19, 2007, which was published in accordance with PCT Article 21(2) on Jan. 10, 2008 in English and which claims the benefit of German patent application No. 10 2006 030 977.4, filed Jul. 3, 2006.

The invention relates to the technical field of data transmission in which a number of data words are transmitted in a data frame with time slots according to a TDM method from a transmitter unit to a receiving unit, and a device for carrying out the method.

BACKGROUND OF THE INVENTION

In a recent generation of audio mixing console, 16 audio channels can be processed, for example. Said audio channels are mono channels. In such a device, the processing of the audio channels is performed by a DSP processor (digital signal processor). For this purpose, all the channels have been digitized with the aid of one or more A/D converters. The digital audio data firstly pass into a memory unit, from which they are transported as required to the DSP processor. The processed data are distributed to the various loudspeakers via a D/A converter unit or prepared for outputting via digital or analogue interfaces. The outputting of Dolby Digital 5:1 surround sound signals alone necessitates six different mono channels as the DA outputs. The DVD-Audio sampling method uses a word width with 24-bit resolution (dynamic range) and a sampling rate of 96 kHz. The transmission of the six channels from the DSP processor to an output circuit, which is realized for example as an FPGA component in the mixing console that is to be considered, is correspondingly complex. A TDM method (time division multiplex) has proved worthwhile for this data transmission. 16 mono channels each having 32-bit data words can be transmitted simultaneously in the TDM data frame. The transmission of a TDM data frame takes up the time of $1/48\,000$ second. The corresponding wire interface comprises a clock line, a frame synchronization line and two unidirectional, bit-serial data transmission lines. Although such wired interfaces are rather insusceptible to errors, there is nevertheless a problem in the data transmission.

INVENTION

The data transmission according to the TDM methods between DSP and FPSA component takes place largely in automated fashion with the aid of DMA support, that is to say without support on the part of the DSP processor core. The DMA unit (direct memory access) is generally part of the DSP processor. The burden on the DSP processor core is thus relieved and the latter can be devoted to other tasks, such as, for example, decoding or encoding of digital audio data. By contrast, the associated software processed by the DSP processor can be susceptible to errors, particularly if it is still at the development stage. If such an error occurs, then this has the effect that occasionally no new data are made available in the output buffer for the outputting of the audio data. Since the data outputting process proceeds under DMA control, however, this means that the data present in the output buffer is repeatedly output via the TDM interface to the FPGA component. These data are then also reproduced audibly via the loudspeakers, which can lead to unpleasant interfering noise.

It has been observed that it is even possible for a word error to occur in which only an audio sample word is impaired and is not written properly to the output buffer, with the result that all subsequent audio data words are shifted by one position. This is manifested as an interchange of audio channels during the outputting of the data. Consequently, the data for the front loudspeakers left, centre, right and also for the rear loudspeakers and the bass loudspeaker are interchanged, which is likewise presented as an audible effect for the user.

The object of the invention consists in detecting such cases of error and preventing the interfering effects that occur. This object is achieved by means of the measures of the independent claims 1 and 8. In this case, as error detection measure, a number of marking bits are inserted within an unused section of a specific data word of the TDM data frame, wherein the pattern of the marking bits changes in a defined sequence from data frame to data frame. This measure has the effect that in the receiving device it is possible to check whether the data frame that has arrived in each case has the marking bits at the agreed position, and whether the marking bits correspond to the pattern that should be expected next according to the defined sequence. If that is not the case, an error is detected and it is possible either to set an error state register or to transmit the error back to the DSP processor, whereby a restart of the software executed on the DSP processor can be initiated. As a result of the restart, the registers would be set anew and the data transmission would also be restarted, so that the possibly existing interchange of the channels would thereby be eliminated. The error detection is also based on the fact that a pattern of the marking bits situated in the output buffer would be repeatedly transmitted via the DMA data output process. If the defined sequence is then agreed such that said sequence cannot be generated merely by repetition of data frames within the output buffer, the error detection method is reliable.

Advantageous developments and improvements of the invention presented in the independent claims are possible by means of the measures presented in the dependent claims. It is highly advantageous if, in a marking process, the marking bits in each case at the corresponding position within an unused section of the specific data word of the data frame are set in the respectively valid output buffer. This permits checking of the proper processing of the program on the part of the DSP processor.

It is likewise advantageous if the defined sequence for changing the marking bits from data frame to data frame is determined according to how many output buffers are alternately used for data outputting, in order to enable error detection. If, by way of example, two output buffers are alternately used in the DMA process, then it would be advantageous for a sequence of three to be used as the defined sequence. This is because only a sequence of two would arise as a result of the continuous outputting of the content of the two output buffers. The error detection method at the receiving end will evaluate the sequence and signal the error case if it only detects a sequence of two.

DRAWINGS

Exemplary embodiments of the invention are illustrated in the drawings and are explained in more detail in the description below. In the figures.

DESCRIPTION OF THE INVENTION

Figure 1:
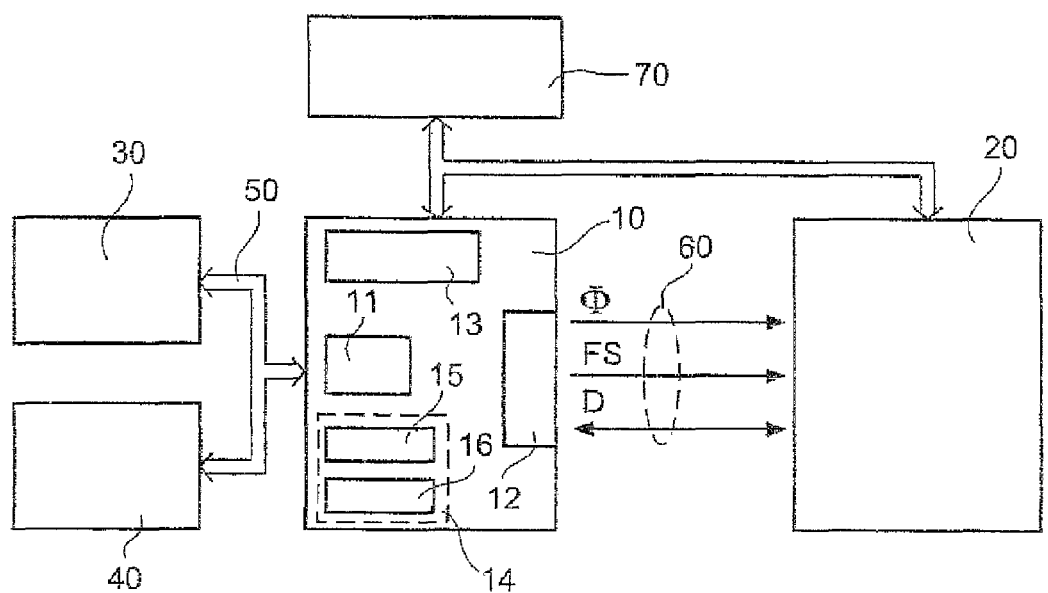
FIG. 1 shows a block diagram of the audio mixing console.

FIG. 1 shows a rough block diagram of the audio mixing console. The reference numeral 10 therein designates the DSP processor. DSP processors have long been known in the prior art and a multiplicity of such processors are available for concrete applications. The signal processor of the ADSP-21161N type from the manufacturer ANALOG DEVICES is mentioned as an example of a concrete realization of the invention. This processor has a specialized processor core, an on-chip memory unit, a DMA unit and also various interfaces for data inputting and outputting. FIG. 1 shows the components: processor core 13, memory unit 14, DMA unit 11 and TDM interface 12. Two output buffers 15 and 16 are separately emphasized within the memory unit 14. The data outputting from said output buffers 15 and 16 to the TDM interface 12 takes place with DMA support.

The reference numeral 30 designates a first external memory component. The reference numeral 40 designates a second external memory component. Both memory components are connected to the DSP processor 10 via a parallel data bus 50. The reference numeral 20 designates an FPGA component (field programmable gate array). The various input/output units for the various audio channels are integrated in the FPGA component 20. The AD and DA converters are arranged externally to the FPGA, not shown. The known SPORT interface, corresponding to a serial port, may serve for data inputting and outputting. A logic serving as TDM interface is furthermore situated in the FPGA 20. This requires, as in any serial data transmission, a shift register and a unit which assigns the data situated therein to the individual AD or DA converter units according to the occupancy in the TDM frame. Furthermore, a so-called state machine is situated in the FPGA component, which state machine performs the error detection with the aid of the method according to the invention. The FPGA component 20 likewise comprises further interfaces. Thus, a bus interface is provided, for example, with the aid of which a further microcontroller 70 can perform settings. For this purpose, the external microcontroller 70 is connected via a further bus 80 to the FPGA component 20 and the DSP processor 10. Typical settings in the FPGA component relate to the possibility of selecting which of the DA channels present are intended to be forwarded via the TDM interface 60 to the DSP processor 10, and the selection of the DA converters via which the data processed by the DSP are intended to be output.

Figure 2:
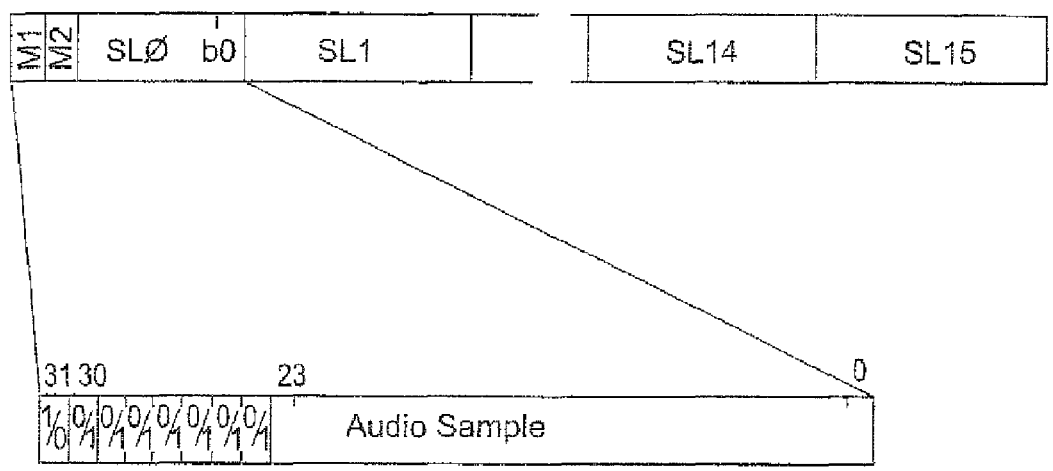
FIG. 2 shows the TDM data frame.

FIG. 2 shows the construction of the TDM data frame. The TDM data frame comprises time slots for 16 data words. The individual time slots are marked by the reference symbol SL0 to SL15. A 32-bit data word can be transmitted within each time slot SL0 to SL15. In the case of the application shown in which audio data words are transmitted, audio data words are transmitted with a dynamic range of 24 bits. That is to say that a data section having a width of 8 bits is unused in each time slot SL0 to SL15. FIG. 2 illustrates that said data section is localized in each case at the start of a time slot and, however, relates to the respective last 8 bits having the numbers 24 to 31 of the data word. This TDM data frame suffices for the transmission of 16 audio channels (mono channels). Depending on the application, not all 16 time slots have to be used simultaneously. In particular, there is a difference in the transmission of the data from the FPSA 20 to the DSP processor 10 and the opposite direction from the DSP processor 10 to the FPGA component 20. The device is an audio mixing console. Therefore, the main task of said device consists in mixing a plurality of audio channels. Therefore, a single mixed channel will arise from a plurality of audio channels, and is then intended to be output again. In the opposite direction, that is to say from the DSP processor 10 towards the FPGA component 20, therefore, usually fewer channels are to be output.

The marking bits for error checking are designated by the reference numerals M1 and M2 in FIG. 2. These bits are positioned at the start of the TDM data frame. However, the marking bits are situated only at the start of the first time slot of the data frame. The remaining 6 bits of the unused 8-bit section of the first data word still remain unused. They contain the so-called extension sign bit of the audio data word present in the time slot. Thus, there is either a 0 everywhere or a 1 everywhere in this section. The marking bits M1 and M2 are set separately on the part of the software of the DSP processor in the marking process. Only the two bit patterns %01 and %10 are used in this case. This is likewise illustrated in FIG. 2.

Figure 3:
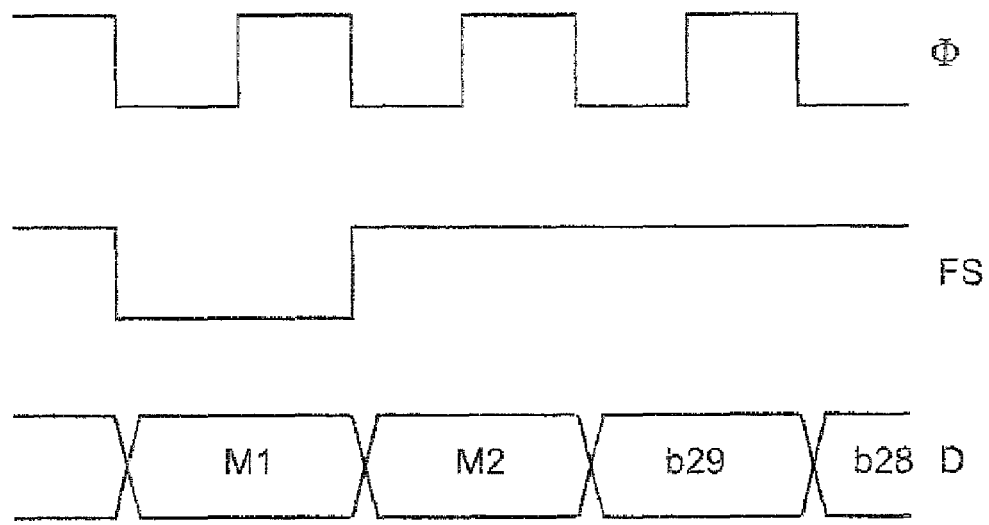
FIG. 3 shows a signal diagram for the data transmission via the wired TDM interface.

FIG. 3 shows a signal diagram for the data transmission via the TDM interface 60. The clock signal is shown in the first line. With the falling edge in the clock signal, a start signal FS is transmitted via the synchronization line at the beginning of a data transmission. Said start signal is active low and has a duration only of the transmission time of a data bit. Simultaneously with the start signal, the first data bit is transmitted via the data line D. The first marking bit M1 is involved since, after all, this bit is transmitted first in the data frame. The wired interface 60 is designed as a master/slave bus interface. The corresponding TDM interface 12 in the DSP processor 10 operates as master, whereas its counterpart in the FPGA component 20 operates as slave. Therefore, the clock for the data transmission is predetermined by the DSP processor 10. Likewise, the frame synchronization signal via the FS line is also formed only by the DSP processor 10.

A sequence of three is used as defined sequence for changing the bit pattern of the marking bits. If the first bit pattern %01 is designated as F0 and the second bit pattern %10 as F1, then the defined sequence is of the type F1-F0-F0. This sequence cannot be generated by the alternating outputting of the data in the two output buffers 15 and 16 by means of the automated DMA process. Only the sequences F1-F0-F1-F0 . . . and F0-F0-F0 . . . could occur in the error case. If the error detection unit in the FPCA component 20 is programmed for the sequence F1-F0-F0 to be expected, it will detect the error as soon as the marking process fails in the DSP processor 10.

The marking process proceeds in such a way that the two first bits in the output buffer 15 and 16 are set in a dedicated manner corresponding to the defined sequence before the outputting of the data situated in the output buffers takes place.

Figure 4:
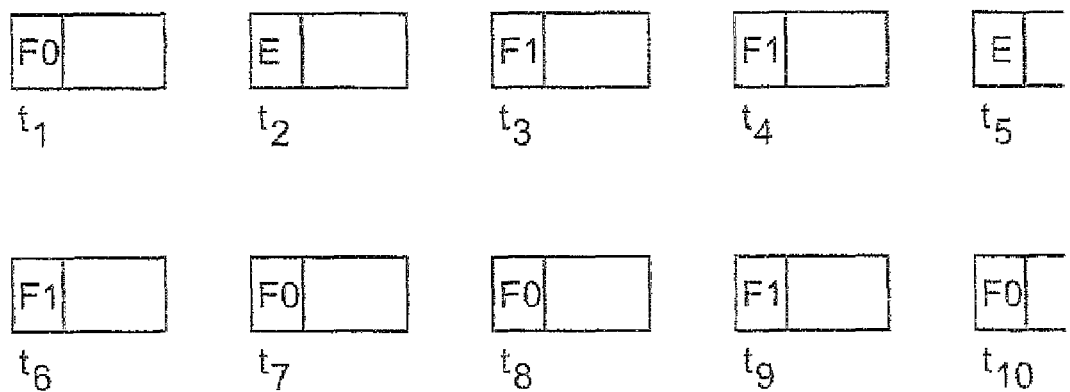
FIG. 4 shows an exemplary sequence of the pattern of the marking bits in the case of errors that have occurred.

FIG. 4 shows an example of a sequence that occurs. The F0 bit pattern is detected at the instant $t_1$. It is assumed that the bit pattern lies at the correct position in the sequence and, therefore, no error is detected at this instant. At the instant $t_2$, neither of the two bit patterns F0 and F1 used is found in the TDM data frame. As described, only the two bit patterns %10 and %01 are used as marking bit patterns. Thus, the bit patterns %00 and %11 still remain, which can occur at the first position in the data frame in the error case. This could happen if e.g. the DMA process likewise causes an error. Since the first 8 bits in each time slot SL0 to SL15 are unused and are either all set at "0" or all set at "1", the failure of a data word, due to the DMA process, would thus also be detected as an error. If the error were detected at the instant $t_2$, the DSP software stack is restarted. The subsequent data frames F1, F1 and E would still be detected as erroneous since the defined sequence F1-F0-F0 has not yet occurred in the data stream. It is only at the instant $t_8$ that the outputting of the data to the loudspeakers is enabled, since the defined sequence F1-F0-F0 then occurs properly in the data stream for the first time. The sequence is then also complied with in the further data transmissions at the instants $t_9$ and $t_{10}$.

Figure 5:
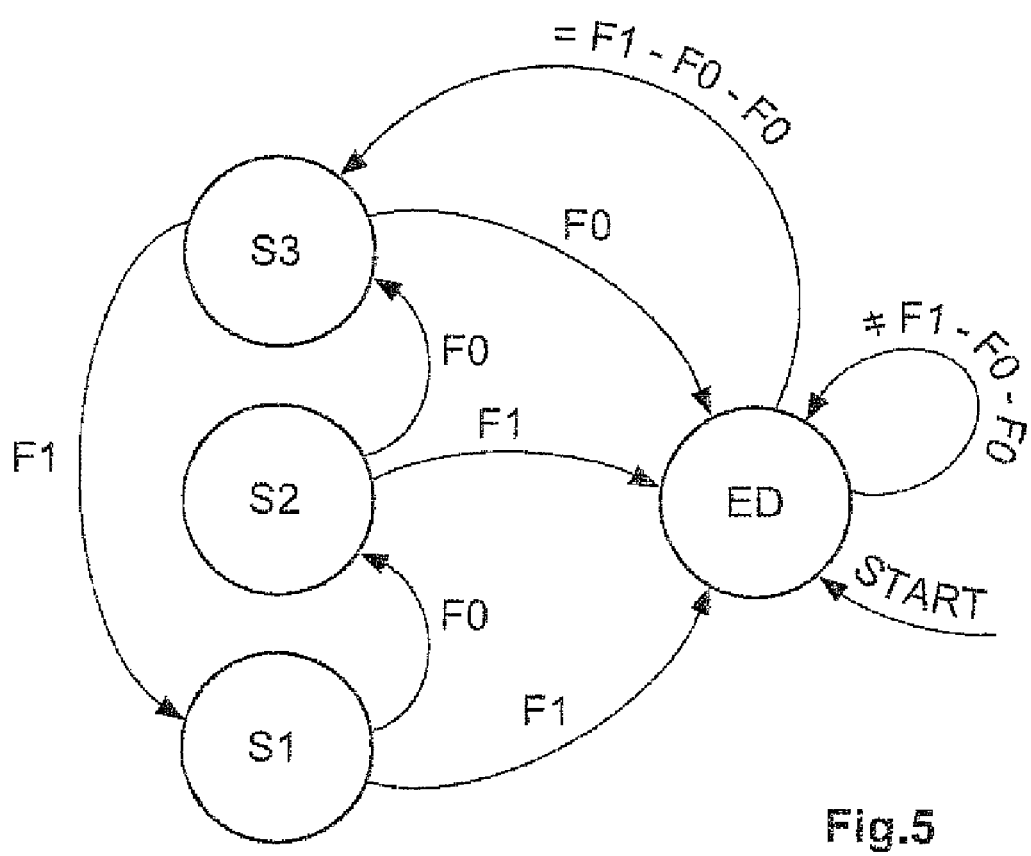
FIG. 5 shows a state diagram for an error detection unit in the receiving unit for the data transmission via the TDM interface.

As mentioned, a state machine for error detection is also implemented in the FPGA component 20. The way in which this state machine operates is shown in FIG. 5, which illustrates four states S1, S2, S3 and ED using circles. If the bit pattern F1 has arrived in the data stream, for example, the state S1 is adopted first. If the bit pattern F0 occurs next in the data stream, then the state machine changes from the state S1 to the state S2. If the bit pattern F0 then once again occurs in the data stream, the state machine changes from the state S2 to the state S3. In this case, the defined sequence F1-F0-F0 has been found properly and no error is detected. The state change is correspondingly repeated if the marking bits having the pattern F1 are detected next in the data stream. The state machine then changes back again from the state S3 to the state S1.

If the bit pattern F1 is detected instead of F0 in one of the states S1 or S2, then the state machine immediately changes to the state ED. This state is adopted as soon as an error has been detected. The same applies if the bit pattern F0 is detected next in the state S3. In the error state ED, either an error memory is set or an interrupt is generated which passes to the DSP processor 10 and causes the latter to restart the software, or a reset signal for the DSP processor 10 is generated, or a notification is issued to the external microcontroller 70, which itself instigates the restart of the software of the DSP processor 10. At the same time, however, the outputting of audio data via the DA converter units is prevented in the FPGA unit. This serves to suppress the interfering noise that occurs in the error case. If the error case has occurred, a state change to the state S3 can take place only when the defined sequence F1-F0-F0 has successively occurred again in the data stream. As long as said sequence has not yet arrived, the state machine remains in the error state ED.

Even upon the restart of the device, the state machine initially goes to the error state ED. This is shown in FIG. 5 by the state arrow labelled with the word "start".

Figure 6:
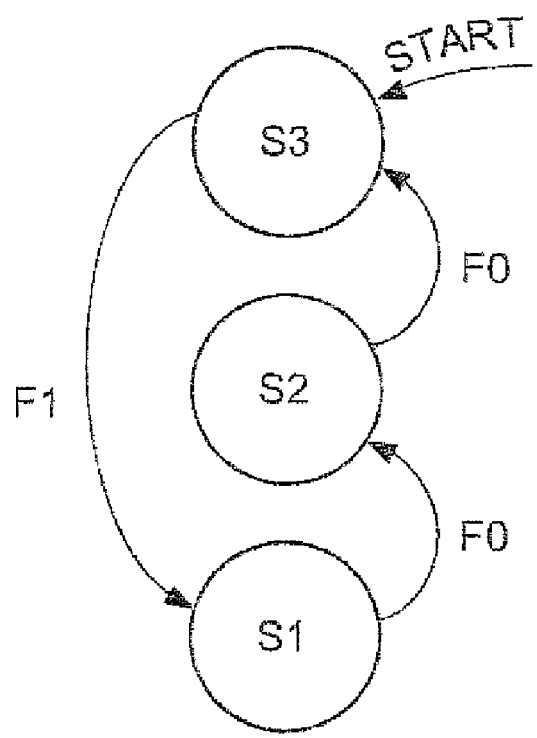
FIG. 6 shows a state diagram for the marking process that proceeds in the transmitting unit during the data transmission according to the TDM method.

FIG. 6 also shows the state machine for the marking process in the DSP processor 10. The marking bits are always set alternately according to the defined sequence F1-F0-F0. Accordingly, the state machine changes from the state S3 to the state S1 and then to the state S2 and from there back to the state S3 again.

The invention is not restricted to the exemplary embodiment described here. Diverse modifications of the exemplary embodiment described are possible. Thus, the number of marking bits can vary depending on the application. If a plurality of output buffers are present, the marking bits must also be extended and the defined sequence will likewise have to be adapted. The position of the marking bits in the data frame can vary. At the same time, the frequency at which marking bits occur in the data frame can be varied.

The invention claimed is:

1. Data transmission method in which a number of data words are transmitted in a data frame with time slots according to a TDM method, corresponding to time division multiplex, from a transmitting unit to a receiving unit, wherein a specific number of output buffers are provided for the outputting of the data frames, said output buffers alternately being used for data outputting, said method including the steps of employing error detection by inserting a number of marking bits at a position within an unused section of at least one specific data word of the data frame thereby establishing a first pattern of marking bits, and changing the pattern of the marking bits to create at least a second pattern from data frame to data frame in a defined sequence, wherein the defined sequence for changing the marking bits from data frame to data frame is determined by using said defined sequence to be the specific number of output buffers plus one.

2. Data transmission method according to claim 1, wherein the specific data word is positioned at the start of the data frame.

3. Data transmission method according to claim 1, wherein the marking bits are positioned at the start or at the end of the specific data word.

4. Data transmission method according to claim 1, wherein, in the case of the data words of the data frame, an unused section is in each case provided at a predetermined position and a bit pattern that can be distinguished from the possible bit patterns of the marking bits is entered into the unused section at least at the position of the marking bits.

5. Data transmission method according to claim 1, wherein the marking bits in each case at the corresponding position within the unused section of the specific data word of the data frame are set in a marking process in the respective output buffer.

6. Device according to claim 5, wherein the specific data word is positioned at the start of the data frame in the output buffer.

7. Device according to claim 5, wherein the marking bits are positioned at the start or at the end of the specific data word in the output buffer.

8. Device according to claim 5, wherein, in the case of the data words of the data frame, an unused section is in each case provided at a predetermined position and the marking means are designed in such a way that they enter a bit pattern that can be distinguished from the possible bit patterns of the marking bits into the unused section at least at the position of the marking bits.

9. Device according to claim 5, wherein the marking means are designed in such a way that they set the marking bits in each case at the corresponding position within the unused section of the specific data word of the data frame in a marking process in the respective output buffer.

10. Device according to claim 5, wherein two output buffers are present, and the marking means are designed in such a way that they change the pattern of the marking bits in a sequence of three.

11. Device according to claim 5, wherein the receiving unit has error detection means that check whether the defined sequence is complied with in the received data frames, and signal an error case if a sequence violation has been detected.

12. Device for carrying out the data transmission method according to claim 1, comprising a transmitting unit and a receiving unit, comprising a transmission link between transmitting and receiving units, which are designed for transmitting a number of data words in a data frame according to a TDM method, corresponding to time division multiplex, wherein a specific number of output buffers are provided in the transmitting unit for the outputting of the data frames, said output buffers alternately being used for data outputting, wherein marking means for employing error detection are provided in the transmitting unit, which marking means access the at least one output buffer and set a number of marking bits at a position within an unused section of a specific data word of the data frame thereby establishing the first pattern of marking bits, wherein the marking means are designed in such a way that they change the pattern of the marking bits to create the at least a second pattern in a defined sequence from data frame to data frame, wherein the defined sequence for changing the marking bits from data frame to data frame is determined by using said defined sequence to be the specific number of output buffers plus one.

* * * * *